United States Patent
Schueller

(10) Patent No.: US 11,124,264 B2
(45) Date of Patent: Sep. 21, 2021

(54) HYDRAULICALLY ACTUATED AUXILIARY BRAKE SYSTEM FOR MOTORCYCLES

(71) Applicant: Charles Robert Schueller, Lakewood, CO (US)

(72) Inventor: Charles Robert Schueller, Lakewood, CO (US)

(73) Assignee: Charles Robert Schueller, Lakewood, CO (US)

( * ) Notice: Subject to any disclaimer, the term of this patent is extended or adjusted under 35 U.S.C. 154(b) by 0 days.

(21) Appl. No.: 16/887,619

(22) Filed: May 29, 2020

(65) Prior Publication Data

US 2020/0377170 A1     Dec. 3, 2020

Related U.S. Application Data

(60) Provisional application No. 62/854,204, filed on May 29, 2019.

(51) Int. Cl.
   *B62L 3/02*    (2006.01)
(52) U.S. Cl.
   CPC .................................. *B62L 3/023* (2013.01)
(58) Field of Classification Search
   CPC .... B62L 3/023; B62L 3/04; B62L 3/08; F16D 212/04; B62K 19/38; B60T 8/261; B60T 8/3685; B60T 8/1706; B60T 8/3225; B60T 11/10; B60T 11/16; B60T 11/165; B60T 17/046
   See application file for complete search history.

(56) References Cited

U.S. PATENT DOCUMENTS

| 4,494,800 | A | * | 1/1985 | Hayashi | B62L 3/023 188/344 |
| 6,082,509 | A | * | 7/2000 | Buckley | B60T 11/232 188/151 R |
| 6,141,964 | A | * | 11/2000 | Green | B60T 11/046 206/223 |
| 6,484,855 | B1 | | 11/2002 | Yaple | |

(Continued)

FOREIGN PATENT DOCUMENTS

| CA | 2544196 A1 | 10/2007 |
| CN | 102126534 A | 7/2011 |

(Continued)

*Primary Examiner* — Robert A. Siconolfi
*Assistant Examiner* — Stephen M Bowes
(74) *Attorney, Agent, or Firm* — Loyal Intellectual Property Law, PLLC; Travis Banta

(57) ABSTRACT

A stand-alone, auxiliary brake system is provided for operating the rear wheel brake of a motorcycle. The auxiliary brake includes an actuator that is connected to a hand lever by a hose. The actuator is mounted to the rear brake using a fastener. A push rod of the actuator is installed onto the rear brake master cylinder replacing the existing push rod. The push rod is attached to a piston, which is mounted inside a cylinder of the actuator. A transfer port on the actuator connects the hose to the cylinder with the fluid inside the hose being pressurized by the hand lever to push the piston to activate the rear brake through the push rod. Thus, the auxiliary brake system provides an efficient and effective braking mechanism through the user's hand actuation without compromising the existing foot pedal braking system.

16 Claims, 6 Drawing Sheets

(56) References Cited

U.S. PATENT DOCUMENTS

| | | | | |
|---|---|---|---|---|
| 7,621,380 B2* | 11/2009 | Wolfe | ............... | B60T 7/102 |
| | | | | 188/2 D |
| 7,722,130 B2* | 5/2010 | Takeuchi | ............... | B62L 3/04 |
| | | | | 303/9.64 |
| 2013/0167526 A1* | 7/2013 | Yoshizawa | ............... | G05G 5/05 |
| | | | | 60/533 |
| 2013/0333994 A1* | 12/2013 | Jordan | ............... | B62L 3/023 |
| | | | | 188/344 |
| 2014/0008139 A1* | 1/2014 | Inoue | ............... | B62K 11/00 |
| | | | | 180/219 |
| 2014/0251125 A1* | 9/2014 | Fritschle | ............... | B60T 11/236 |
| | | | | 92/169.1 |
| 2017/0190323 A1* | 7/2017 | Miwa | ............... | B60T 17/00 |
| 2018/0015983 A1* | 1/2018 | Schueller | ............... | B62L 3/023 |

FOREIGN PATENT DOCUMENTS

| | | | | |
|---|---|---|---|---|
| EP | 1520763 B1 | | 1/2007 | |
| EP | 2055625 A1 | * | 5/2009 | ............. B60T 8/261 |
| EP | 2024206 B1 | | 3/2017 | |
| JP | 09249179 A | * | 9/1997 | |

* cited by examiner

HYDRAULICALLY ACTUATED AUXILIARY BRAKE SYSTEM FOR MOTORCYCLES

The current application claims a priority to the U.S. Provisional Patent application Ser. No. 62/854,204 filed on May 29, 2019.

FIELD OF THE INVENTION

The present invention relates to motor vehicle braking systems. More specifically, the present invention relates to a hydraulically actuated auxiliary brake system for motorcycles.

BACKGROUND OF THE INVENTION

Modern motorcycles have a foot pedal for control of the rear wheel brake system located on the right hand side of the motorcycle. By design this is a good system and works well. The right foot/leg of a user, however, is required under many situations during normal operation when the ability to allow the right foot to be available for stability and to maintain the motorcycle upright. When riding off road on trails or closed course conditions, being able to use the right foot/leg of the user is an extreme advantage and safety factor for the user to prevent the motorcycle from tipping over. Therefore, the installation of an auxiliary left hand rear brake (LHRB) on motorcycles provides an alternate means to operate the rear brake system with the left hand. By using the LHRB for braking and speed control, the user can use both feet to keep the motorcycle balanced and upright when moving or coming to a stop. The LHRB system allows the use of the right foot to negotiate technical terrain switch backs on long downhill sections. The LHRB system improves reaction time significantly when installed on the handle bars for left hand operation, enabling a user to react more quickly using left hand than moving right root to the brake pedal. The modulation of the rear brake is much easier by a hand than a foot since the foot brake functions like a light switch, which is either on or off. The hand also provides a better feel with the modulation than a foot when the user wears a heavy boot. Thus, the LHRB system offers more and better control than a foot pedal brake system, and the resulting better control substantially improves the user safety while riding the motorcycle. Additionally, the LHRB system makes loading and unloading the motorcycle much easier from a pickup or a trailer than the existing foot pedal brake. Further, the enhanced safety and much improved speed control of the LHRB system can efficiently and effectively assist a handicap user with limited ankle movement or amputee. In many existing systems, most auxiliary braking systems for motorcycles focus on replacing the foot pedal brake system with cable style handbrakes. Other conventional systems, known in the art, incorporate an electronic actuator, usually requiring the reliance of power supply of the motorcycle to work. Further, these conventional systems normally replace the functions of the foot pedal entirely.

Thus, it is the objective of the present invention to solve the aforementioned drawbacks and problems and improve on these conventional systems. The present invention is a hydraulically actuated brake system that can drop into any corresponding motorcycle brake system without compromising foot pedal brake functionality. The present invention allows the use of the right foot to negotiate technical terrain switch backs, or long down-hill sections while offers a handlebar means of rear brake actuation, providing quicker, safer, and more controlled braking compared to foot actuation means.

SUMMARY OF THE INVENTION

The present invention is a stand-alone, auxiliary means of operating the rear wheel brake system of a motorcycle. The auxiliary brake system comprises a hydraulically actuated braking mechanism that provides handlebar braking means without compromising the existing foot pedal braking functionality. The auxiliary brake system attaches to the rear brake system of the motorcycle and replaces the Original Equipment Manufacturer (OEM) rear brake cylinder push rod. The auxiliary brake system includes an actuator that is connected to a hand lever through a hose. The hand lever comprises a left hand rear brake (LHRB) hydraulic lever assembly, which exerts hydraulic pressure to the rear brake by activation of a user's hand. The resulting pressure on the rear brake of the OEM master cylinder produces the desired braking to the rear wheels.

The actuator is mounted to the OEM rear brake push rod mounting tab by a fastener being inserted through an aperture of the actuator after the OEM push rod has been removed. A push rod of the actuator replaces the OEM push rod and is installed onto the master cylinder of the OEM rear brake. The push rod is attached to a piston, which is tightly and movably attached to the inside of a cylinder of the actuator. The hose is attached to a transfer port that is located on the actuator adjacent the cylinder. Additionally, the transport port is interiorly connected to the cylinder through a bleed hole that is opened on one side of the actuator and sealed by a bleed fastener. Thus, fluid inside the hose can be pressurized by the user's activation of the hand lever and push the piston, which at the same time moves the push rod and activates the rear brake of the motorcycle, similar to the OEM push rod. The auxiliary brake system, however, is totally separate from and independent of the OEM hydraulic system, thus functioning only through the user's hand activation of the hand lever. Additionally, if the auxiliary hydraulic brake system fails under any circumstance, the existing rear foot pedal brake system will continue to function as designed by the OEM manufacturer since the operation of the OEM motorcycle rear brake system is not changed and remains fully operational as designed by the OEM manufacturer. The auxiliary brake system is not designed or intended to replace the OEM rear brake system, but only provides an optional independent mechanism to actuate the rear brake of a motorcycle efficiently and effectively.

The auxiliary brake system of the present invention is readily installable with no bleeding required and is compatible with conventional braking components, thus making the present invention a drop-in system. The user is recommended, however, to bleed the OEM rear brake system at least twice during a riding season and even more frequently if the system is being used often. Because the auxiliary brake system is stand-alone system, the brake fluid used in the system does not overheat as the rear master cylinder fluid does under heavy use, therefore the fluid will not deteriorate as other systems can. Further, the fluid level in the system is not affected by the wear of the brake pad since the fluid in the system is not integrated with the existing OEM rear brake master cylinder.

DETAIL DESCRIPTIONS OF THE INVENTION

All illustrations of the drawings are for the purpose of describing selected versions of the present invention and are not intended to limit the scope of the present invention.

As can be seen in FIG. 1 to FIG. 6, the present invention is an auxiliary brake system for hydraulically actuating the rear brake system of a motorcycle through a user's hand. The auxiliary brake system is a drop-in hydraulic brake system that attaches to the rear brake system and replaces the existing original equipment manufacturer (OEM) rear brake push rod. In the preferred embodiment of the present invention, the auxiliary brake system provides an optional mechanism of actuating the existing rear brake system of the motorcycle. Thus, present invention allows the user to activate the rear brakes by hand, while not compromising functionality of an existing foot lever brake.

Figure 1:
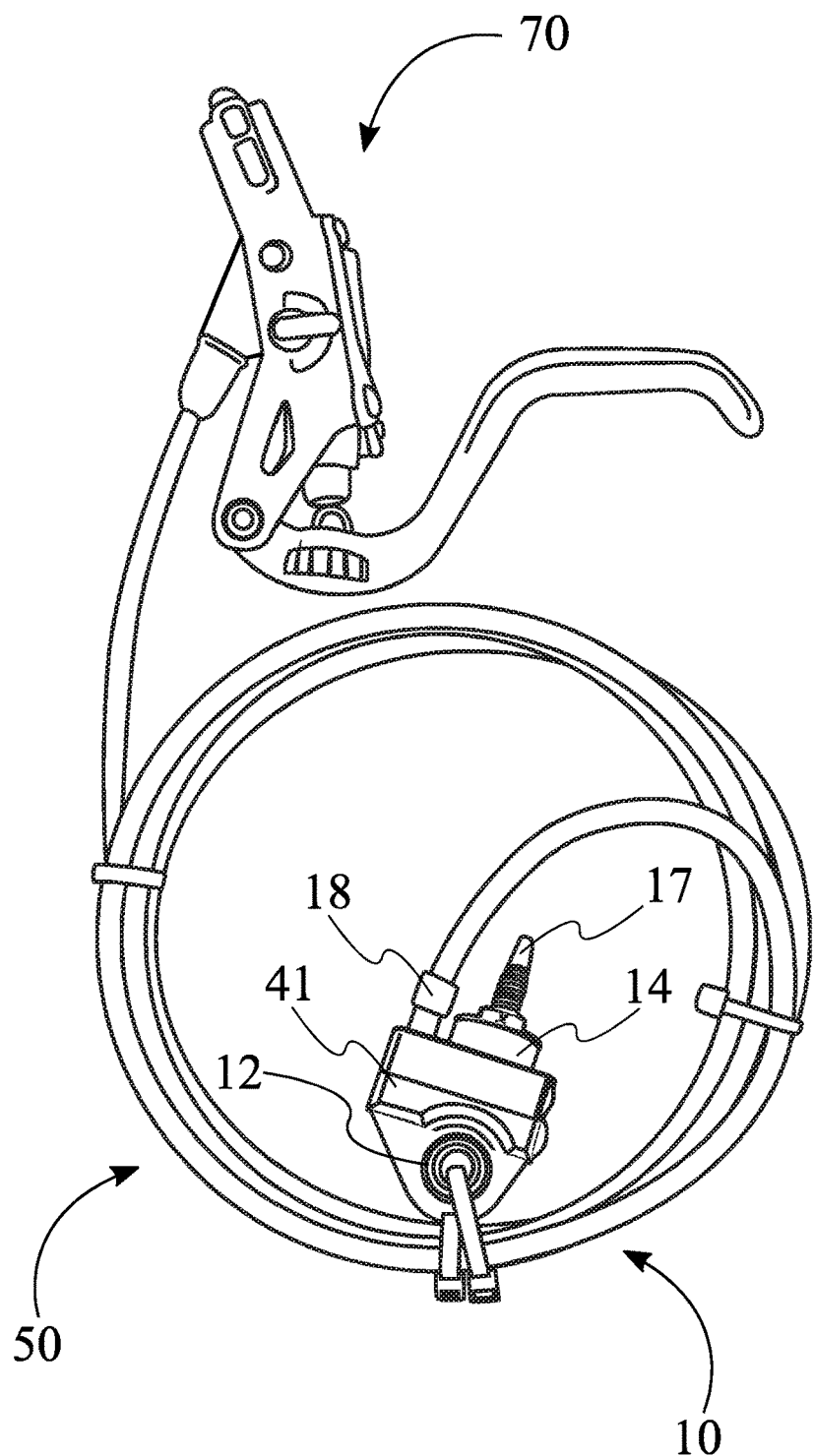
FIG. 1 is a perspective view of the present invention.
Figure 2:
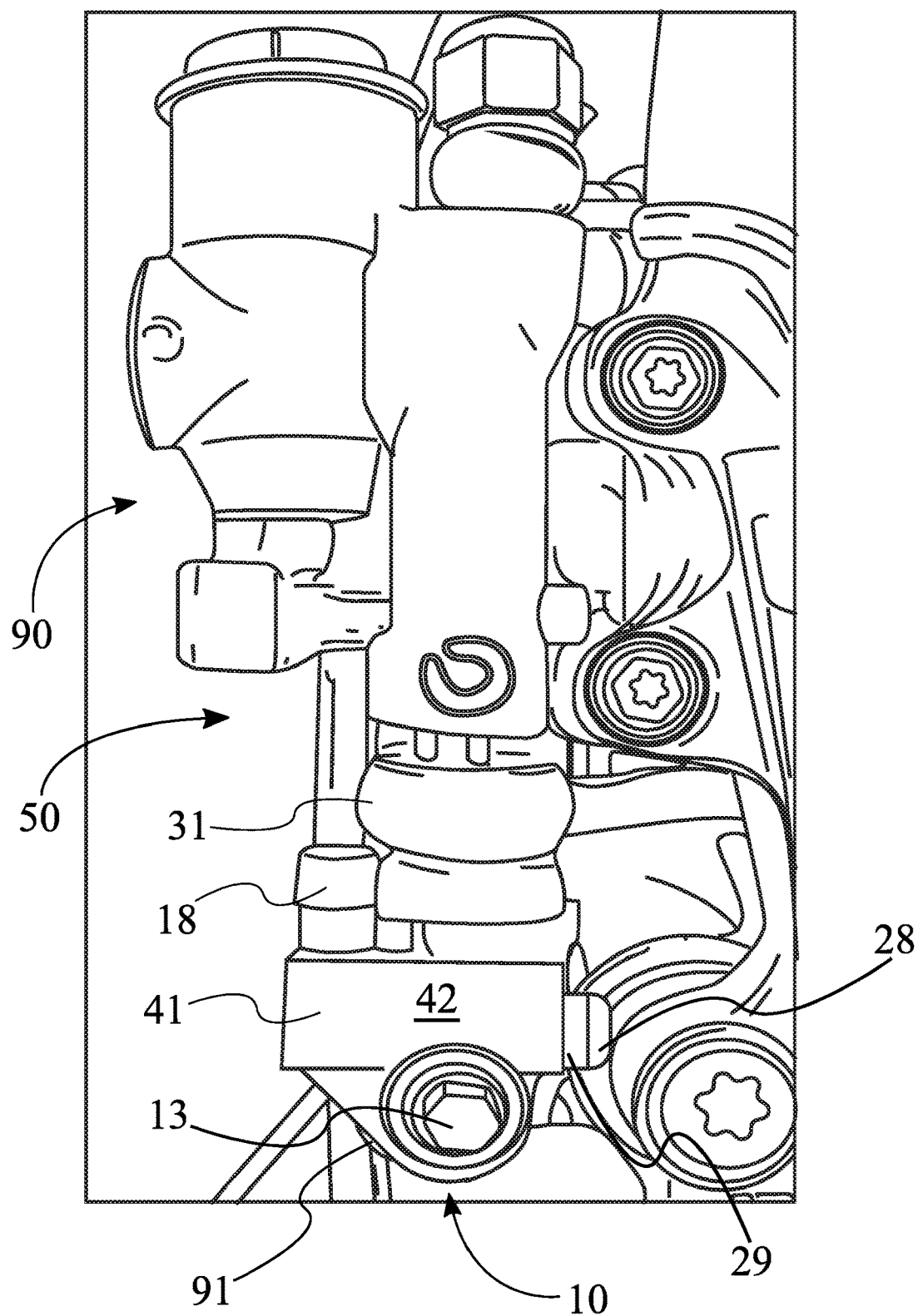
FIG. 2 is a front view of the present invention, wherein an actuator is installed onto the master cylinder of a motorcycle replacing the existing rear brake pedal push rod.
Figure 3:
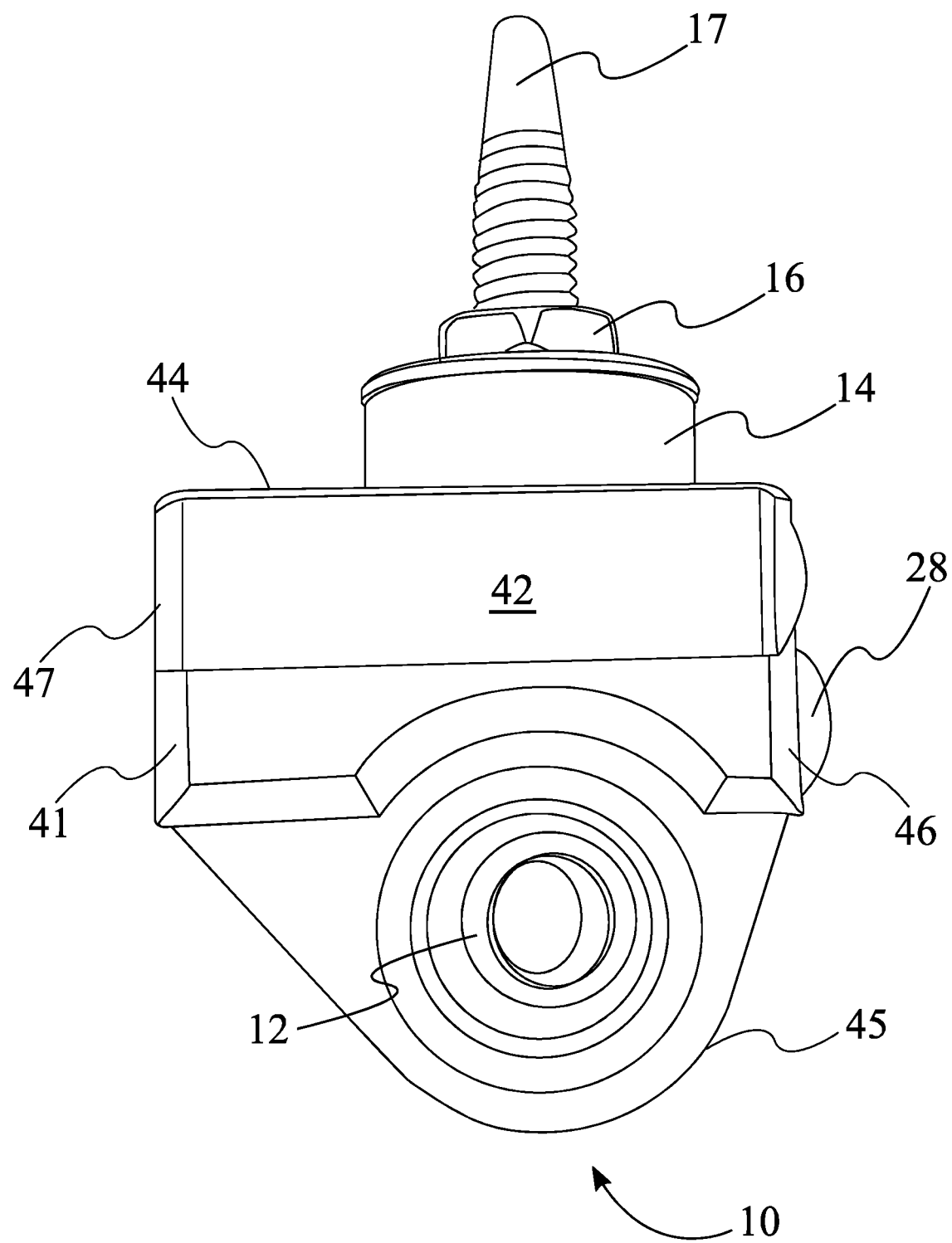
FIG. 3 is a front view of the actuator of the present invention.

As can be seen in FIG. 1 to FIG. 6, the auxiliary brake system of the present invention comprises: an actuator 10, a hose 50, a hand lever 70, the existing master cylinder 90, and a mounting tab 91 of the rear brake pedal push rod of the motorcycle. The actuator 10 comprises an aperture 11, a first cylinder 14, a push rod 17, a transfer port 19, and a piston 21. Specifically, the aperture 11 traverses the actuator 10. The first cylinder 14 is positioned on the actuator 10 opposite the aperture 11 and positioned perpendicular to the aperture 11. Additionally, the aperture 11 is a through-hole that corresponds to the OEM rear brake push rod mounting site and serves as a mounting platform, facilitating the drop-in installation and/or function of the actuator 10. The transfer port 19 is positioned within the actuator 10, parallel with and adjacent the first cylinder 14. The piston 21 is concentrically positioned within the first cylinder 14. The push rod 17 is adjustably and concentrically mounted on the piston 21. Additionally, the push rod 17 of the actuator 10 is inserted into the master cylinder 90 where the existing OEM push rod of the rear brake system of the motorcycle was installed. The actuator 10 is attached to the master cylinder 90 of the rear brake system of the motorcycle, replacing the existing OEM rear brake push rod. Further, the actuator 10 is mounted to the mounting tab 91 of the rear brake pedal push rod of the motorcycle through the aperture 11 of the actuator 10. The existing mounting tab 91 is positioned along the OEM rear brake push rod mounting site below the master cylinder 90, specifically conforming and aligning the actuator 10 along the activation end of the master cylinder 90 where the OEM push rod was originally attached and the replacing auxiliary brake system of the present invention is to be mounted. More specifically, the existing mounting tab 91 serves as the mounting platform for the actuator 10. The hose 50 is attached to both the transfer port 19 of the actuator 10 and the hand lever 70, which is mounted to the existing handle bar of the motorcycle. Thus, the actuator 10 is positioned along the site of the OEM rear brake push rod, particularly replacing the OEM rear brake push rod adjacent to the existing master cylinder 90. Further, the actuator 10 takes form of a hydraulically activated slave cylinder that works in conjunction with the hose 50 and hand lever 70, allowing the user to apply the rear brakes along the handles, facilitating hand braking. As can be seen in FIG. 1 and FIG. 3, the actuator 10 of the auxiliary brake system of the present invention comprises a bearing 12. Specifically, the bearing 12 is concentrically mounted within the aperture 11. In the preferred embodiment of the present invention, the bearing 12 may include, but is not limited to, a spherical bearing and any other suitable bearing. The bearing 12 provides self-alignment of the actuator 10 with the master cylinder 90 of the rear brake system of the motorcycle, as can be seen in FIG. 2.

As can be seen in FIG. 2, the actuator 10 comprises a fastener 13. More specifically, the fastener 13 traverses the bearing 12 and is mounted to the mounting tab 91 of the rear brake pedal push rod of the motorcycle. In the preferred embodiment of the present invention, the fastener 13 is the existing fastener that was used to mount the existing push rod to the mounting tab 91 of the rear brake pedal push rod of the motorcycle. The fastener 13 is positioned along the aperture 11, concentrically aligning and securing the actuator 10 on the existing master cylinder 90 through the existing mounting tab 91 of the rear brake pedal push rod of the motorcycle. Further, the fastener 13 can take form of any corresponding fastener that may or may not be the existing fastener used to secure the original OEM rear brake push rod component.

Figure 4:
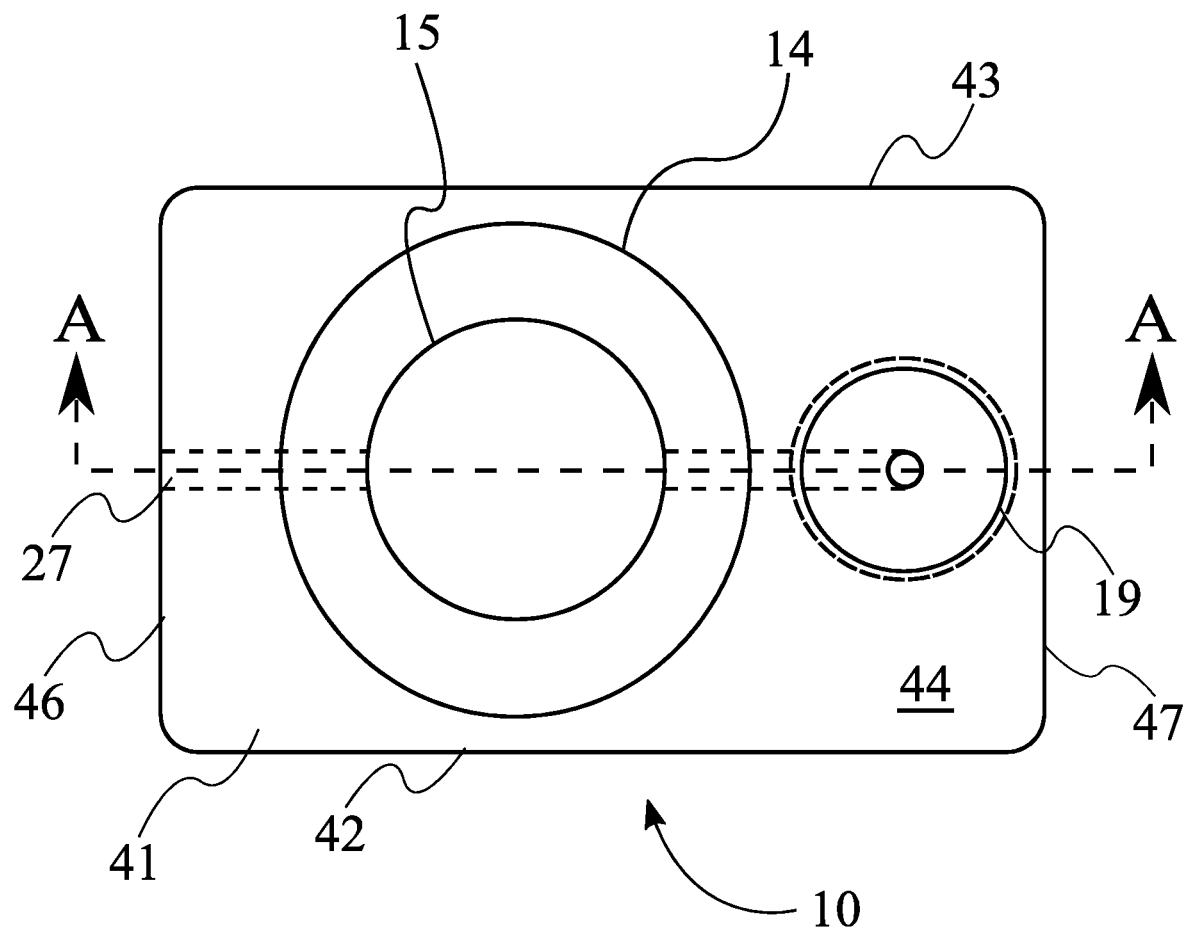
FIG. 4 is a top view of the actuator of the present invention indicating the direction of section cut A.
Figure 5:
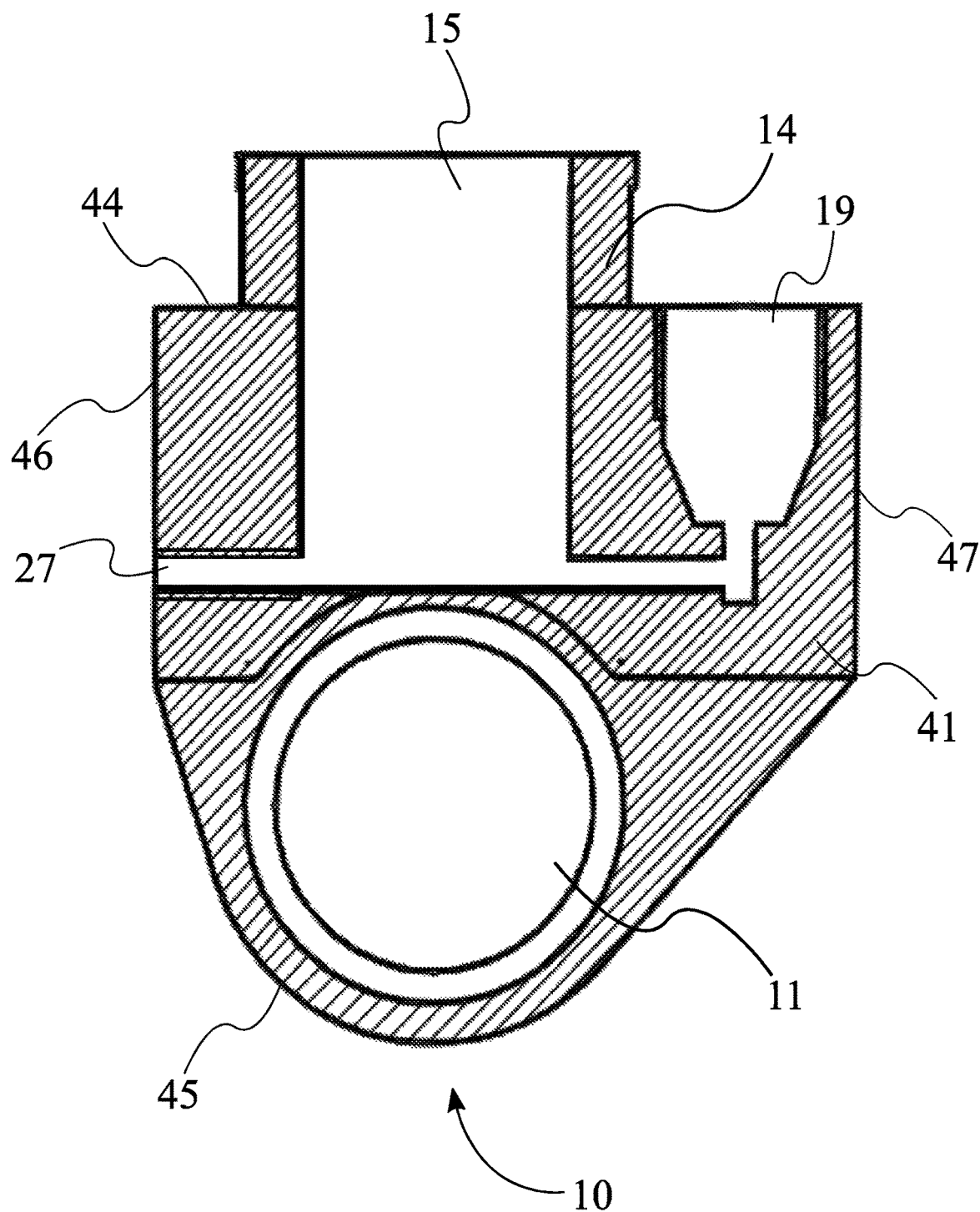
FIG. 5 is a front view of the present invention taken along line A-A in FIG. 4.

As can be seen in FIG. 4 to FIG. 5, the actuator 10 comprises a bleed hole 27, a bleed fastener 28, and a bleed seal (not shown). More specifically, the bleed hole 27 is positioned within the actuator 10 adjacent the aperture 11 and opened on the side of the actuator 10 opposite the transfer port 19. Additionally, the bleed hole 27 traverses through the first cylinder 14 and is connected to the transfer port 19. The bleed fastener 28 is terminally and concentrically mounted to the bleed hole 27. The bleed seal is concentrically attached to the bleed fastener 28 and tightly compressed against the actuator 10 by the bleed fastener 28 to seal the bleed hole 27. Additionally, the bleed seal may include, but is not limited to, a mechanical gasket, O-ring, rubber seal, etc.

As can be seen in FIG. 1 to FIG. 5, in an embodiment of the present invention, the actuator 10 comprises a body 41. The body 41 comprises any suitable shape and material. The body 41 comprises a front 42, a back 43, a first surface 44, a second surface 45, a first side 46, and a second side 47. More specifically, the first surface 44 is positioned on the body 41 opposite the second surface 45. The first side 46 is terminally positioned on the body 41. The second side 47 is terminally positioned on the body 41 opposite the first side 46. The aperture 11 is positioned on the body 41 adjacent the second surface 45 and traverses the body 41 from the front 42 to the back 43. The first cylinder 14 is positioned on the body 41 opposite the aperture 11. Additionally, the first cylinder 14 is positioned perpendicular to the first surface 44 of the body 41. The first cylinder 14 takes form of the hydraulic driver of the actuator 10 that enacts hydraulic pressure along the pushing rod 17. The first cylinder 14 comprises main hole 15 which is concentrically positioned within the first cylinder 14. The piston 21 is interiorly and concentrically positioned in the main hole of the first cylinder 14. Further, the bleed hole 27 is opened on the first side 46 of the body 41 and traverses through the first cylinder 14. The bleed seal is tightly compressed against the first side 46 of the body 41 by the bleed fastener 38 to seal the bleed hole 27.

Figure 6:
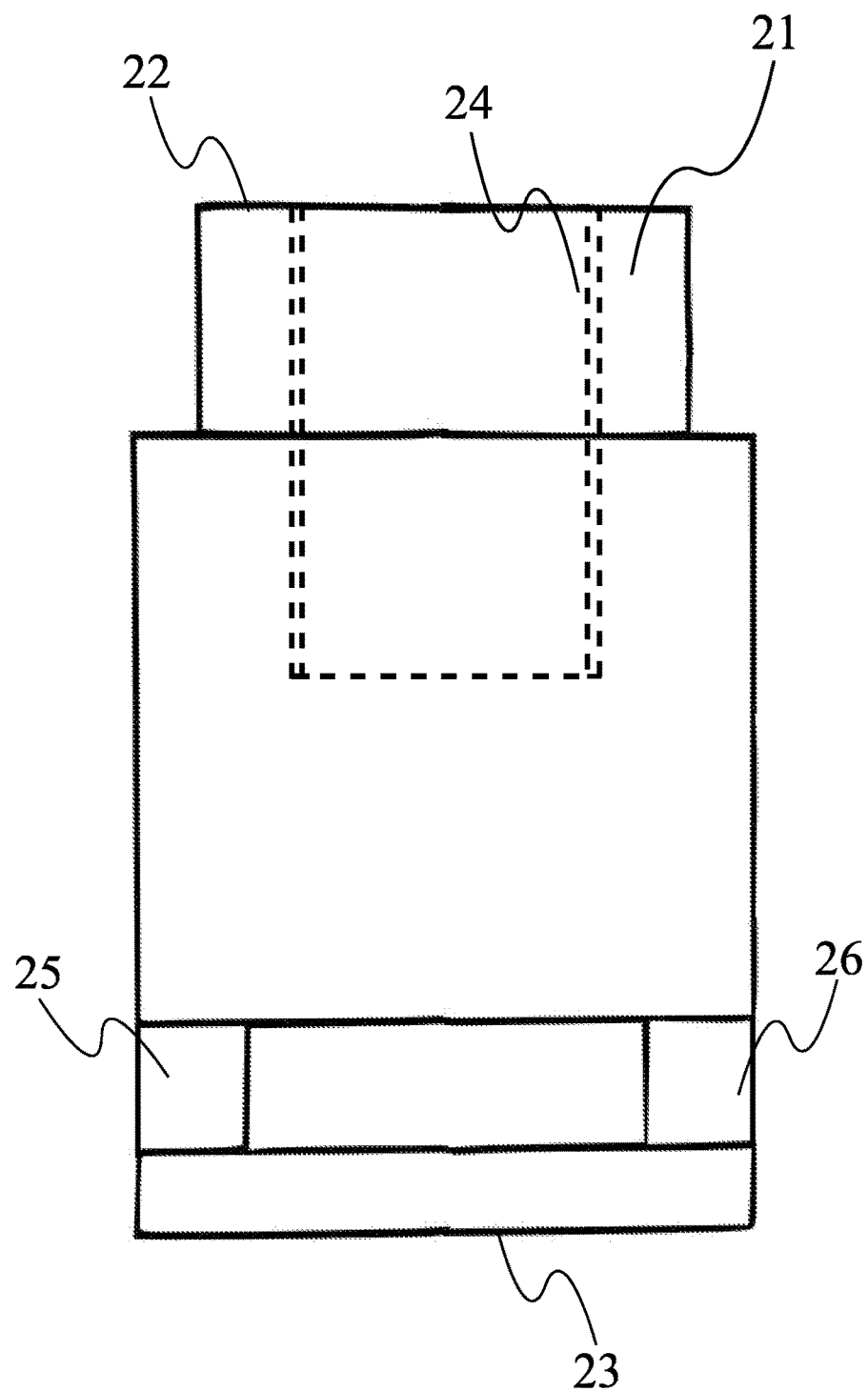
FIG. 6 is a front view of a piston installed inside the actuator of the present invention.

As can be seen in FIG. 1, FIG. 3, and FIG. 6, the piston 21 of the actuator 10 comprises a first end 22, a second end 23, a threaded hole 24, a slot 25, and a piston seal 26. Specifically, the threaded hole 24 is concentrically positioned within the piston 21. The second end 23 is positioned within the piston 21 adjacent the aperture 11 of the actuator 10. The first end 22 is terminally positioned on the piston 21 opposite the second end 23. The push rod 17 is mounted onto the piston 21 through the threaded hole 24, thus aligning with the OEM push rod activation site of the master cylinder 90. Additionally, the push rod 17, firmed attached to the piston 21, retracts and extends along the first cylinder 14 in activating the rear brake master cylinder 90, serving as a corresponding push rod replacement. The slot 25 is cylindrically positioned on the piston 21 adjacent the second end 23 and the piston seal 26 is tightly positioned on the slot 25 to seal the main hole 15 of the first cylinder 14. In the preferred embodiment of the present invention, the piston seal 26 includes, but is not limited to, a mechanical gasket, an X-ring, an O-ring, a rubber seal, or any suitable gasket.

As can be seen in FIG. 1 and FIG. 3, the actuator 10 comprises a lock nut 16. Specifically, the lock nut 16 is exteriorly and concentrically attached to the push rod 17 and terminally positioned against the main hole 15 of the first cylinder 14. The lock nut 16 may include, but is not limited to, square lock nut, square nut, lock nut, jam nut, and any other suitable fastener. Additionally, the lock nut 16 allows the user to adjust the activation length of the push rod 17 that determines the brake sensitivity/strength enacted by the actuator 10 on the master cylinder 90. When loosened, the lock nut 16 allows the user to twist the push rod 17 along the first cylinder 14, lengthening or shortening the push rod 17 to a desired length, and securing the desired length configured along the push rod 17.

As can be seen in FIG. 1 to FIG. 2, the actuator 10 comprises a fitting 18. More specifically, the fitting 18 is terminally and concentrically mounted to the transfer port 19 and exteriorly and concentrically connected to the hose 50. The fitting 18 is positioned adjacent to the first cylinder 14. Additionally, the fitting 18 takes form of a hydraulic connecting agent, working in conjunction with the hose 50, and allowing the hydraulic fluid to flow into the first cylinder 14 upon activation by the user's hand through the hand lever 70.

As can be seen in FIG. 2, the actuator 10 comprises a shroud 31. More specifically, the shroud 31 is exteriorly and concentrically attached to the first cylinder 14 of the actuator 10 and the existing master cylinder 90 of the motorcycle. The shroud 31 encapsulates the push rod 17, the lock nut 16 and the first cylinder 14 of the actuator 10. Additionally, the shroud 31 takes form of a brake boot cover that conceals and protects the push rod 17, the lock nut 16, and the first cylinder 14, when the push rod 17 is installed onto the existing master cylinder 90 of the rear brake system of the motorcycle.

As can be seen in FIG. 1 to FIG. 2, the hose 50 is connected to the transfer port 19 through the fitting 18 of the actuator 10. Additionally, the hose 50 is connected to the hand lever 70, which is mounted to the handle bar of the motorcycle. The hose 50 may include, but is not limited to, a hydraulic brake hose, and any other suitable hose, which strategically traverses from the actuator 10 to the hand level 70 of the corresponding motorcycle.

As can be seen in FIG. 1, the hand lever 70 is connected to the hose 50 opposite the actuator 10. The hand lever 70 is positioned along the handle bar of the corresponding motorcycle. More specifically, the hand lever 70 takes form of a hydraulic brake handle that is capable of delivering hydraulic fluid to create enough pressure to push the piston 21 inside the first cylinder 14 of the actuator 10. Thus, the hand lever 70 serves as the switching agent and activates the piston 21, which subsequently applies the desired activation force through the push rod 17 along the master cylinder 90 of the rear brake system. The hand lever 70 may include, but is not limited to, a hydraulic hand lever, a Hayes® Prime Hydraulic Hand Lever and equivalent, and any other suitable hand lever.

Although the invention has been explained in relation to its preferred embodiment, it is to be understood that many other possible modifications and variations can be made without departing from the spirit and scope of the invention as hereinafter claimed.

What is claimed is:

1. An auxiliary brake system for hydraulically actuating a rear brake system of a motorcycle through a user's hand, the auxiliary brake system comprising:
   a hydraulic actuator;
   a hose;
   a hand lever;
   the hydraulic actuator comprising an aperture, a first cylinder, a push rod, a transfer port, and a piston;
   the aperture traversing the hydraulic actuator;
   the first cylinder being positioned on the hydraulic actuator opposite the aperture;
   the first cylinder being positioned perpendicular to the aperture;
   the transfer port being positioned within the hydraulic actuator parallel with and adjacent the first cylinder;
   the piston being concentrically positioned within the first cylinder;
   the push rod being adjustably and concentrically mounted on the piston;
   the hydraulic actuator being positioned with respect to a master cylinder of the rear brake system of the motorcycle such that the push rod pushes against and applies pressure to the master cylinder of the rear brake system of the motorcycle;
   the hydraulic actuator being mounted to a push rod mounting tab of the rear brake system of the motorcycle through the aperture;
   the hose being attached to both the transfer port of the hydraulic actuator and the hand lever; and
   the hand lever being mounted to a handle bar of the motorcycle.

2. The auxiliary brake system as claimed in claim 1, wherein the push rod of the hydraulic actuator is inserted into the master cylinder.

3. The auxiliary brake system as claimed in claim 1, comprising:
   the hydraulic actuator comprising a bleed hole, a bleed fastener, and a bleed seal;
   the bleed hole being positioned within the hydraulic actuator adjacent the aperture;
   the bleed hole being opened on the side of the hydraulic actuator opposite the transfer port;
   the bleed hole traversing through the first cylinder;
   the bleed hole being connected to the transfer port;
   the bleed fastener being terminally and concentrically mounted to the bleed hole;

the bleed seal being concentrically attached to the bleed fastener; and the bleed seal being compressed against the hydraulic actuator by the bleed fastener to seal the bleed hole.

4. The auxiliary brake system as claimed in claim 1, comprising:

the hydraulic actuator comprising a fitting;

the fitting being terminally and concentrically mounted to the transfer port; and the fitting being exteriorly and concentrically connected to the hose.

5. The auxiliary brake system as claimed in claim 1, comprising the hydraulic actuator comprising a shroud; and the shroud being exteriorly and concentrically attached to the first cylinder of the hydraulic actuator and is exteriorly and concentrically attached to the master cylinder of the motorcycle.

6. The auxiliary brake system as claimed in claim 1, comprising:

the hydraulic actuator comprising a bearing; and the bearing being concentrically mounted within the aperture.

7. The auxiliary brake system as claimed in claim 6, wherein the bearing is a spherical bearing that provides self-alignment of the hydraulic actuator with the master cylinder of the rear brake system of the motorcycle.

8. The auxiliary brake system as claimed in claim 6, comprising:

the hydraulic actuator comprising a fastener;

the fastener traversing the bearing; and the fastener to mounts the push rod mounting tab of the rear brake system of the motorcycle.

9. The auxiliary brake system, as claimed in claim 8, wherein the fastener mounts the push rod to the push rod mounting tab of the rear brake system of the motorcycle.

10. The auxiliary brake system as claimed in claim 1, comprising:

the hydraulic actuator comprising a body;

the body comprising a front, a back, a first surface, a second surface, a first side, and a second side;

the first surface being positioned on the body opposite the second surface;

the first side being terminally positioned on the body;

the second side being terminally positioned on the body opposite the first side;

the aperture being positioned on the body adjacent the second surface; and the aperture traversing the body from the front to the back.

11. The auxiliary brake system as claimed in claim 10, comprising:

the first cylinder of the hydraulic actuator being positioned on the body opposite the aperture; and the first cylinder being positioned perpendicular to the first surface of the body.

12. The auxiliary brake system as claimed in claim 10, comprising:

the hydraulic actuator comprising a bleed hole, a bleed fastener, and a bleed seal;

the bleed hole being positioned within the body adjacent the aperture;

the bleed hole being opened on the first side of the body;

the bleed hole traversing through the first cylinder;

the bleed hole being connected to the transfer port;

the bleed fastener being terminally and concentrically mounted to the bleed hole;

the bleed seal being concentrically attached to the bleed fastener; and the bleed seal being compressed against the first side of the body by the bleed fastener to seal the bleed hole.

13. The auxiliary brake system as claimed in claim 1, comprising:

the first cylinder of the hydraulic actuator comprising a main hole;

the main hole being concentrically positioned within the first cylinder;

the piston being interiorly and concentrically positioned in the main hole of the first cylinder;

the piston comprising a first end, a second end, and a threaded hole;

the threaded hole being concentrically positioned within the piston;

the second end being positioned within the piston adjacent the aperture of the hydraulic actuator;

the first end being terminally positioned on the piston opposite the second end; and the push rod being mounted onto the piston through the threaded hole.

14. The auxiliary brake system as claimed in claim 13, comprising:

the hydraulic actuator comprising a lock nut;

the lock nut being exteriorly and concentrically attached to the push rod; and the lock nut being terminally positioned against the main hole of the first cylinder.

15. The auxiliary brake system as claimed in claim 13, comprising:

the piston comprising a slot and a piston seal;

the slot being cylindrically positioned on the piston adjacent the second end; and the piston seal being positioned on the slot to seal the main hole of the first cylinder.

16. The auxiliary brake system as claimed in claim 15, wherein the piston seal is an X-ring.

* * * * *